Dec. 18, 1934.                C. W. ABBOTT                1,984,356
                          ELECTRIC WIRING SYSTEM
                     Filed Dec. 10, 1931    6 Sheets-Sheet 1

INVENTOR
Charles W. Abbott
BY
Janney, Blair & Burton
ATTORNEYS

Dec. 18, 1934.    C. W. ABBOTT    1,984,356
ELECTRIC WIRING SYSTEM
Filed Dec. 10, 1931    6 Sheets-Sheet 3

INVENTOR
Charles W. Abbott
BY ATTORNEYS

Dec. 18, 1934.  C. W. ABBOTT  1,984,356
ELECTRIC WIRING SYSTEM
Filed Dec. 10, 1931   6 Sheets-Sheet 4

Fig. 6.

INVENTOR
Charles W. Abbott
BY his ATTORNEYS

Dec. 18, 1934.  C. W. ABBOTT  1,984,356
ELECTRIC WIRING SYSTEM
Filed Dec. 10, 1931  6 Sheets-Sheet 5

INVENTOR
Charles W. Abbott
BY his ATTORNEYS
Janney, Blair & Curtis

Patented Dec. 18, 1934

1,984,356

UNITED STATES PATENT OFFICE 1,984,356

ELECTRIC WIRING SYSTEM

Charles W. Abbott, Larchmont, N. Y., assignor to The Bryant Electric Company, Bridgeport, Conn., a corporation of Connecticut Application December 10, 1931, Serial No. 580,111

26 Claims. (Cl. 247—3)

The invention relates to a wiring system, and with regard to its more specific features to a surface wiring system.

One object of the invention is to provide a wiring system of great flexibility. Another object of the invention is to provide a wiring system susceptible of embodiment in attractive design. Another object of the invention is to provide a wiring system that may be easily and quickly installed. Another object is to provide a wiring system readily adaptable to changes. Other objects will be in part obvious or in part pointed out hereinafter.

The invention accordingly consists in the features of construction, combinations of elements, and arrangements of parts as will be exemplified in the structure to be hereinafter described and the scope of the application of which will be indicated in the following claims.

In the accompanying drawings, in which are shown several of the various possible embodiments of the mechanical features of this invention;

Figure 5 is a cross sectional view of a hanging conductor constructed in accordance with the invention;

Similar reference characters refer to similar parts throughout the several views of the drawings.

As conducive to a clear understanding of the present invention, it is noted that a surface wiring system has inherent advantages over a concealed wiring system, insomuch as alteration or replacement of the former does not involve cutting into the walls of a building in which the wiring is applied. Furthermore, the original installation of a surface wiring system is simpler than the original installation of a concealed wiring system. Another respect in which a surface wiring system possesses an advantage over a concealed wiring system resides in the fact that in a concealed wiring system it is difficult to provide new outlets, the operation almost always involving the cutting into a wall and being sometimes attended by great expense.

Despite these inherent advantages of surface wiring systems, they have been used only to a limited extent so far as the original installation of wiring is concerned, and to a scarcely greater extent in the replacement or extension of wiring. This is because surface wiring systems as heretofore developed have in many cases involved moldings or other rigid bodies which are extremely inflexible, highly conspicuous and relatively expensive in all cases. Cords heretofore developed for surface wiring, except in their costly, heavy duty forms, have been approved by underwriters only in short lengths.

Another defect of surface wiring systems as heretofore developed resides in the fact that the making of additional outlets therein is almost as difficult as in the case of concealed wiring systems. Furthermore, the material of most previously existing wiring systems has been unsightly and not at all adapted to be embodied in a form which is either attractive in itself or capable of being harmonized with other fittings, fixtures or furnishings. The above and many other defects in heretofore existing wiring systems, including concealed wiring systems and surface wiring systems, has rendered the extension of an already existing system difficult or costly or both, and made the original installation of wiring a costly matter and, furthermore, has hampered the electrical industry by rendering the relocation of wiring or the provision of additional outlets an undertaking of such magnitude that many owners, tenants, householders and others have refrained from using all the electrical appliances which they otherwise would use.

The present application describes certain aspects of an invention described and claimed in a co-pending application Serial Number 571,962, filed by me on October 30, 1931. In that application a conduit or extension feeder of great flexibility and wide range of practical application or installation and adapted to be embodied in very small size is described and claimed singly and in combination with certain means for tapping or making electrical connection to the conductors in the conduit, and the means for making the connection between these two elements is described and claimed singly and in combination. I therefore make no claim in the present application to features which are claimed in my above-mentioned co-pending application. The present application nevertheless, for facilitating a readier understanding of the inventions herein contained, describes the main features of the application above referred to and is specifically directed to the hanging conductor and means for and method of connecting the extension feeder material or conduit into circuit with a concealed wiring system. It is also directed to various outlets adapted to be incorporated in or established from a hanging conductor and various other features and combinations which will hereinafter more fully appear as the description of an illustrative embodiment of the invention proceeds.

Figure 2:
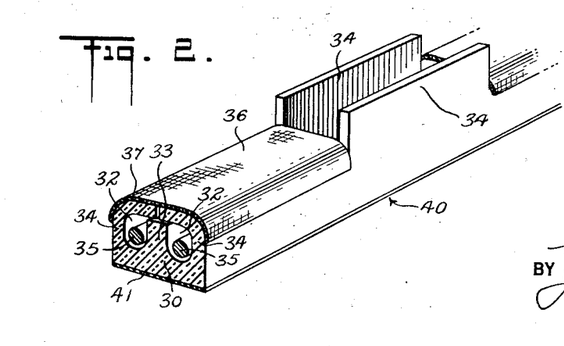
Figure 2 is a perspective view of an extension feeder.

Referring now to Figure 2, there is illustrated in perspective elevation and cross section a conduit which, because of its particular practicability for that purpose, I may term an extension feeder. This conduit comprises a base portion 30 which is preferably made of a rubber compound containing clay or other filler. The material of the conduit is preferably resilient enough to conform to various irregular surfaces to which it may be applied, but not so resilient that it will be distorted by sharp bends or tension of any kind. Thus the extension feeder may be located in various places without affecting its insulating qualities by reason of distortion thereof.

On the upper surface of the base 30 are formed a pair of raceway grooves 32, 32 separated by a ridge portion 33. At the sides of the base portion 30 are a pair of flaps 34, 34 integral with the base portion and these flaps are originally disposed in an upright position as shown in the central portion of Figure 2. The flaps 34, 34, when the conduit is first formed, extend substantially above the level of the ridge portions 33. With the flaps 34, 34 in upright parallel relation as shown by the central portion of Figure 2, bare wires 35, 35 of good contacting material are inserted in the raceways 32, 32, in which they fit with a loose fit. The flaps 34, 34 are then folded inwardly to the position shown in the left-hand portion of Figure 2 so that their edges nearly abut, a slight gap being left between the edges of the flaps as clearly shown in Figure 2 in order that they shall not be integrally joined in the ensuing vulcanizing operation. Preferably also, the flaps 34, 34 are held in spaced relation to the central ridge 33, as by the interposition of a strip of paper between the flaps and the ridge, to prevent vulcanization at this point.

With the flaps 34, 34 folded inwardly and downwardly as described and held in this position by a suitable device, a fabric tape 36, which preferably has on its under surface a thin coating of rubber 37 is sealed over the flaps 34, 34. As shown in Figure 2, the fabric 36 extends from the vertical edge wall of the base portion 30 on one side to the vertical edge wall on the opposite side, covering the junction between the flaps 34, 34 and holding them in the arcuate folded position illustrated. The conduit is then vulcanized thus uniting the coating of rubber 37 with the flaps 34, 34 holding the latter securely in the position illustrated in the left-hand portion of Figure 2.

For the attachment of conduits or extension feeders 40 to a wall, whether of wood, cement, tile, plaster, or other surface, an adhesive 41, such as glue or paste, is deposited on the back of the base member 30. By reason of the simple construction of the extension feeder 40, including the fact that being made of a dielectric the wires 35 therein may be bare, the extension feeder 40 may be very small in cross section and consequently very light in weight and quite inconspicuous; for example it may be on the order of one-half an inch in width and one-quarter of an inch in thickness.

Figure 1:
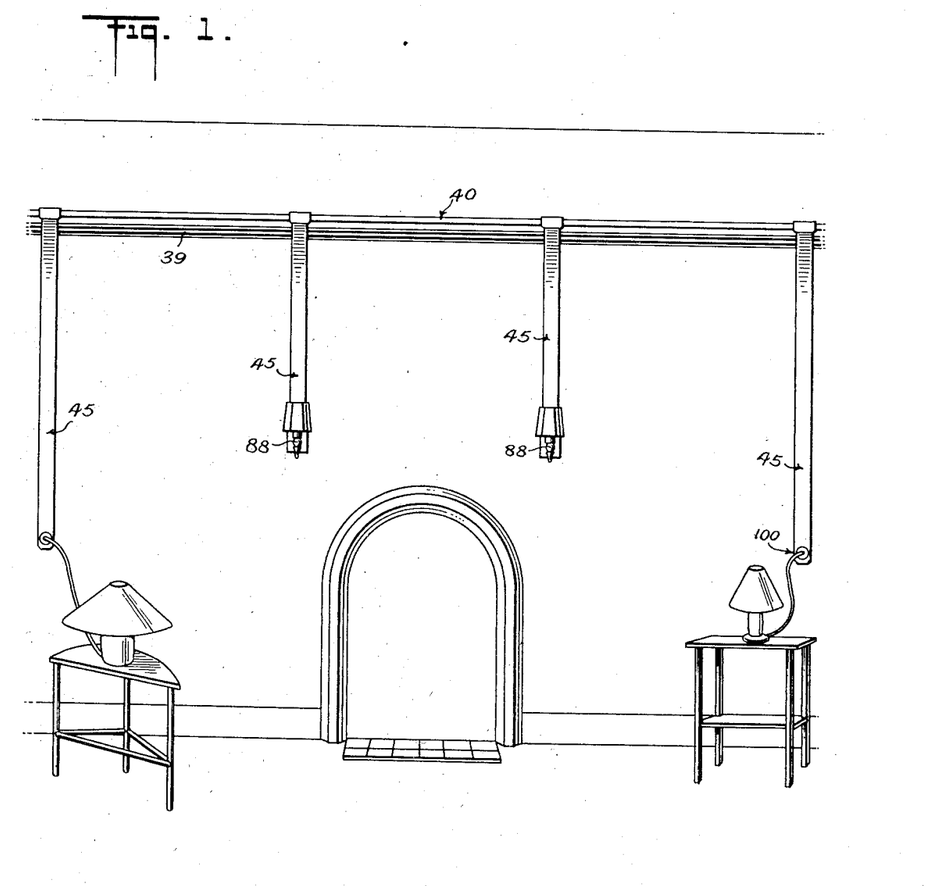
Figure 1 is a perspective view showing the interior of a room wired in accordance with the invention.

Referring now particularly to Figure 1, the conduit or extension feeder 40 may extend along the walls of a room, being affixed thereto by the adhesive 41. Although my invention is in nowise limited to any particular mode of use of the extension feeder 40, it may be conveniently located just above picture mouldings, door frames, window frames, baseboards and the like, being indicated as located above a picture moulding 39 in Figure 1.

Figure 3:
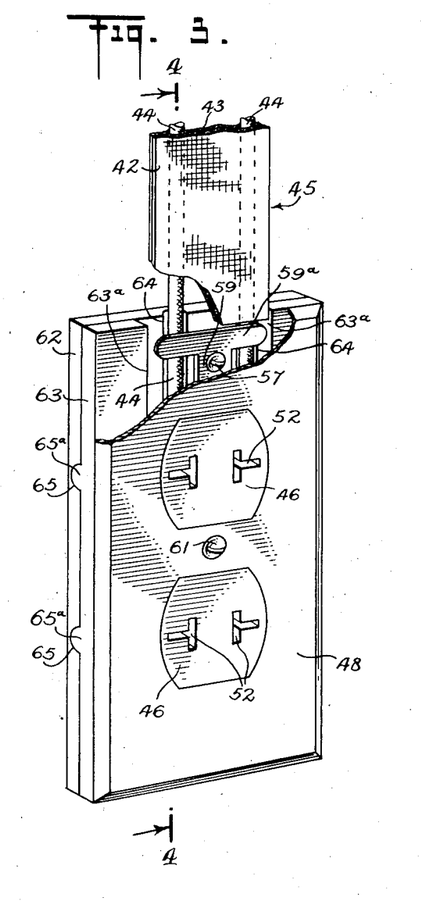
Figure 3 is a perspective view of a wall outlet with a hanging conductor connected thereto, certain parts being broken away to show the construction.

Referring now to Figure 3, the extension feeder 40 may be connected to a suitable source of electric energy by means of a hanging conductor which is generally designated by the numeral 45, a preferred method of attaching the hanging conductor 45 to the extension feeder 40 being hereinafter described. The wires 44, 44 of the hanging conductor 45 may be connected to the electric mains leading to an outlet receptacle 46, and the material 42 and 43 of the hanging conductor mechanically secured to a receptacle box 47 flush with the usual cover plate 48 thereof, thus making a neat and secure connection according to a simple method of procedure such as will now be described.

Figure 4:
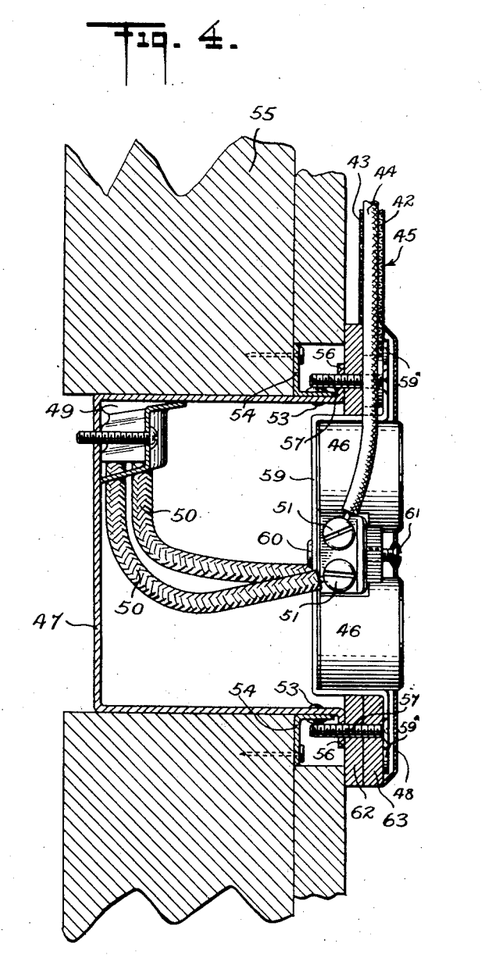
Figure 4 is a vertical sectional view of the wall outlet and conductor, the section being taken on the line 4—4 of Figure 3.

Referring to Figures 3 and 4, a typical form of outlet includes a box 47 into which is passed a cable 49 that encloses conductors 50, 50 of a concealed wiring system. The outlet also includes one or more receptacles 46, 46 having binding posts 51, 51 and slots 52, 52 for the reception of the prongs of one or more plugs on the ends of lamp cords or the like.

Referring now to Figure 4, attached to the box 47 by means of screws 53, 53 are adjustable brackets 54, 54 by means of which the box may be attached to the wall 55 of a building or to any other structure desired. Struck outwardly from the ends of the box 47 are lugs 56, 56 to which is fastened, as by means of screws 57, 57, a piece of pressed metal 59 bent into U-shape and formed to fit around the pair of receptacles 46, 46 which may be riveted to it as by means of a rivet 60. The plate 48 is attached to the receptacles by means of a screw 61, which extends into a tapped hole in the material of the receptacles, which are usually made of a phenolic composition product, or the like. The foregoing description of an outlet is descriptive of one commercial form thereof as it exists apart from my invention.

Still referring to Figures 3 and 4, the plate 48 is removed from the box 47 and the metal bracket 59 is removed from the lugs 56 and a pair of mats 62 and 63 having the same over-all dimensions as the plate 48 and preferably made of resilient material, such as rubber, are placed over the box 47, whereupon the metal bracket 59 and the mats are secured in position by the screws 57. The mats 62 and 63 are cut away to allow the receptacles 46, 46 to pass through them, and the mat 63 is further cut away at 63a as shown in Figure 3 to provide room for the wires 44—44 behind the plate 48. The material 42 and 43 is cut off so that it shall extend just below the top of the plate 48 when the plate is relocated in position, and as better shown in Figure 3 terminates substantially at a transverse portion 59a of the metal bracket 59, under which transverse portion extend wires 44—44 which are thereby clamped in position if desired, or the upper portion of the bracket 59 may be spaced from the mat 63 by means of washers on the upper screw 57. The wires 44—44 extend around the outside of the receptacles 46 to the binding post 51, there being four binding posts 51 for the two receptacles 46 in the type of outlet illustrated, only two of these binding posts being shown in Figure 4, it being understood that there is another pair similarly located on the other side thereof, not shown. The openings cut out of the mats 62 and 63 are wide enough to allow the wires 44, 44 to pass through around the upper receptacle 46. The connection having been made as described, the cover plate 48 is reattached by means of the screw 61, and thus the wires 44, 44 are connected in circuit with the wires 50, 50 while the connection in circuit of the receptacles 46, 46 is in no wise disturbed, and the several parts are neatly covered by the plate 48 which, however, is spaced from the wall 55 permitting the material 42 and 43 of the hanging conductor to merge into the outlet in a neat manner.

Although the receptacle box 47 and parts associated therewith are of standard construction, many different varieties of outlets will be met with in practice. Furthermore, it may be desirable to introduce the conductor 45 into the outlet from the side rather than from the top. Consequently variations of the method and construction described may be adopted. Furthermore, in order to avoid having the mats 62 and 63 of undue thickness, I prefer to provide grooves 64, 64 in the mat 62 in which the wires 44 may lie, and grooves 65, 65 are preferably provided in the sides of the mat 62 for the connection of the conductor 45 at this point if desired. The mat 63 may have projecting portions 65a fitting in the grooves 65 and assisting in aligning the parts if desired. It should be understood that the mat 63 may have an unbroken circumference and, preferably being of rubber, may be readily cut away at 63a or at any other desired place.

Referring now to Figures 1, 3, 5, 7 and 8, the hanging conductor 45 is adapted to not only connect the extension feeder 40 in circuit with the main source of electric current but also to lead the current to additional sockets or fixtures. By reason of its flat form it may be made to lie close to a wall of a room and it may have a decorative surface to harmonize with the color scheme of the room. A preferred form of hanging conductor is illustrated in the above mentioned figures, and referring more particularly to Figures 3 and 5, the material 42 constitutes a band-like facing which may be of silk, cotton, or other fabric of a non-metallic nature that is primarily decorative. Secured to the facing 42 is a lining or backing 43 which is preferably of any relatively tough material such as a thin canvas. The materials 42 and 43 may be secured together in any suitable manner such as by stitching 66. In the backing 43 are plaits 67, 67 receiving the insulated wires 44, 44, and it will be seen that the plaits 67, 67 are thus located in the back of the hanging conductor 45 so that they do not appear at all on the front surface thereof, while the hanging conductor 45 may hang close to a wall as shown in Figures 3 and 4 with the facing 42 spaced from the wall by a distance just sufficient to leave room for the plaits 67 and the wires 44.

Preferably the plaits 67 enclose the wires 44, 44 without securing them from relative longitudinal movement with respect thereto. By permitting relatively free movement between the wires 44, 44 and the material of the hanging conductors 45, binding is eliminated, and the hanging conductor may be pulled taut and made to lie flat without wrinkles or creases and may also be slightly distorted from a given plane without destroying its neat, smooth and attractive appearance. The backing or lining 43 is preferably strong enough to sustain the weight of an outlet or a fixture or any other apparatus which may be connected to it, and furthermore it permits the attachment of electrical apparatus to the hanging conductor by the use of screws, as will be hereinafter described. The facing 42, being primarily ornamental, need not have great strength, and in fact practically any desired decorative material may be used for the facing 42 as support is provided by the backing or lining 43. However, it is noted that by reason of the enclosure of the insulated wires 44, 44 in the plaits 67, 67, by reason of the fact that the only part of the hanging conductor 45 which contacts with the wall is a relatively tough material, and furthermore because of the wide spacing of the wires 44, 44, the close braid ordinarily applied to covered conductors may be altogether dispensed with in order to reduce the size of the completed structure and in the interests of flexibility and economy in construction.

Figure 11:
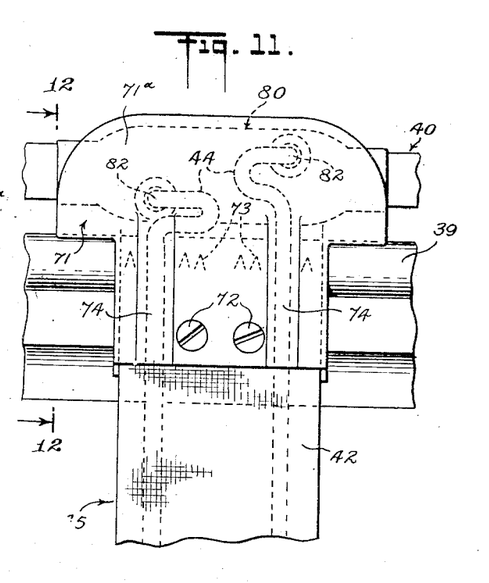
Figure 11 is a front elevation of the support for a hanging conductor and the connections connecting it to an extension feeder.
Figure 12:
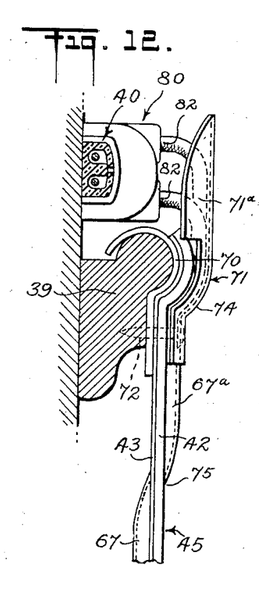
Figure 12 is a view partly in cross section and partly in elevation, the section being taken on the line 12—12 of Figure 11.

Referring particularly to Figure 12, for the support of a hanging conductor 45 from a picture moulding 39 a hook 70 is provided. Referring now also to Figure 11, the hook 70 has fastened to it a shield member 71 which is preferably made of sheet metal. These parts may be connected by means of screws 72, 72. Between the hook 70 and the shield member 71 is located the hanging conductor 45, and the hanging conductor is held in position not only by the clamping of these two parts together by means of the screws 72, 72 but also by reason of the fact that these screws pass through the material 42, 43 of the hanging conductor 45. If desired the screws 72, 72 may have pointed ends and may extend into the moulding 39, assuming that it is made of wood, all as illustrated in Figure 12.

Preferably teeth 73 are formed in the shield member 71 to assist in gripping the material 42, 43 of the hanging conductor 45. In order that the wires 44, 44 may be received between the hook 70 and the shield 71 while allowing a firm clamping action on the material 42, 43, grooves 74 are formed in one of these parts, preferably in the shield member 71. The wires 44, 44 force the material 42 into the grooves 74, 74, and thereby create wrinkles in the lining 43 whose plaits 67, 67 do not at that point receive the wires 44, 44, and thus the lining 43 is clamped tightly in place between the shield 71 and the hook 70 without undue pressure upon the conductors. The wires 44, 44, whose axes are displaced to the front of the hanging conductor where it is attached to the hook 70, cross to the rear thereof at about the point marked 75 in Figure 12.

The lower portion of the shield member 71 is formed to conform to the front surface of the hook 70 as shown in Figure 12. The hook 70 may be located on a picture moulding 39 or any other support at any desired position, bringing the hanging conductor close to the extension feeder 40. The upper portion 71a of the shield member 71 is preferably broad and covers the connection between the wires 44, 44 of the hanging conductor 45 and the wires 35, 35 of the extension feeder 40. A preferred form of such connection will now be described.

Referring now to Figure 2 in connection with Figures 11 and 12 inclusive, the conduit or extension feeder 40 may be tapped at any place, and contact blocks including connections secured in place at the points selected. In order to lay bare the wires 35, 35 the covering 36 of the conduit 40 is severed in lines perpendicular to the length of the extension feeder. This may be done with a knife, and the cut should be made deep enough to cut through the flaps 34, 34 down to a level with the edge of the fabric tape 36. By reason of the fact that the vulcanized or cemented union between the covering 36 and the flaps 34, 34 readily yields to a tearing action after a transverse cut has been made in the covering, and after, in some cases, a knife has been used to make a partial slit along the cemented or vulcanized union, the uncovering of the wires 35 at a selected point is an operation requiring only a short amount of time and needing only unskilled labor for the performance thereof. The wires 35 are reasonably loose in the raceways 32 so that they may be withdrawn from or pulled along said raceways to a limited extent to allow them to be raised above or beyond the ridge portion 33 for the attachment of the wires to binding posts hereinafter described. Preferably the wires 35 are bare so that no scraping and cutting action will be required in connection with the establishment of an outlet connection.

Figures 16, 17, 18, 19, 21, 22:
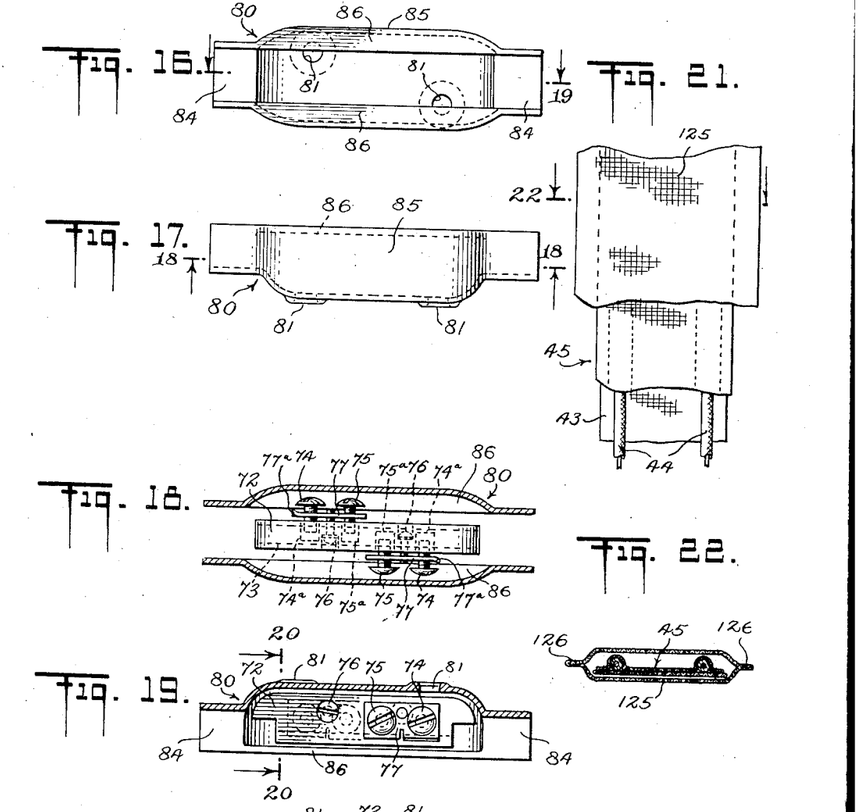
Figure 16 is a rear elevation of a cover.
Figure 17 is a plan view of the cover.
Figure 18 is a cross sectional view of the cover taken on the line 18—18 of Figure 17 and showing a contact block in elevation therein.
Figure 19 is a longitudinal sectional view of the cover taken on the line 19—19 of Figure 16, also showing the contact block in elevation.
Figure 21 is a front elevation of a hanging conductor and covering therefor on a reduced scale.
Figure 22 is a transverse sectional view taken on the line 22—22 of Figure 21.
Figure 20:
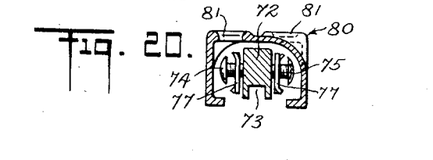
Figure 20 is a cross sectional view of the cover and the contact block, the section being taken on the line 20—20 of Figure 19.

Referring now to Figures 18, 19 and 20, I provide elongated narrow contact blocks 72 which are preferably made of readily mouldable dielectric material such as one of the phenolic compositions. The contact blocks 72 have grooves 73 in one face thereof, as illustrated particularly in Figure 20. The grooves 73 are of a size to fit with a pressed fit over the central ridge 33 of the base 30 of the extension feeder or conduit 40. In a preferred embodiment of the invention this ridge 33 has nothing cemented to it and consequently it is at all times clean, and, after removal of the fabric covering, the contact block may be readily frictionally secured in place on the ridge 33.

Referring now particularly to Figure 18, a pair of binding post screws 74 and 75 are located in staggered relation on each side of the block 72. Supported by screws 76 the heads of which are located in countersunk portions of the block 72, are contact plates 77 having tapped holes for the reception of the binding post screws 74 and
75. The binding post screws 74 and 75 are received in countersunk holes 74a and 75a provided in the sides of the contact block 72. In this way the clearance between the heads of the screws 74 and 75 and the contact plate 77 may be large or small, as desired under varying conditions. Preferably the supporting screws 76 are embedded in the countersunk recesses by filling the recesses with a suitable compound such as sealing wax, which insulates the screws and prevents them from unscrewing.

After the covering of the conduit 40 has been removed for a limited distance as described, and either before or after the contact block 72 has been placed in position on the ridge 33, the conductors 35 are pulled out of the raceways 32 and passed between the binding posts 74 and lips 77a on the plates 77, and the binding posts 74 are then screwed down tightly. In this manner the contact plates 77 as well as the binding posts 75 are electrically connected to the conductors 35. Furthermore, the tension on the conductors 35 tends to hold the contact block 72 in position. A slight amount of drawing of the conductors 35 in the raceways 32 suffices to allow them to be connected, as described, to the contact blocks, and it is noted that by reason of the freedom of the conductors in the raceways such withdrawal of the conductors takes place without distortion of or injury to the base 30 or its covering. Thus, not only is the conduit flexible, but the conducting wires therein are themselves flexible to an extent great enough to permit as much tapping of the extension feeders as desired without replacement thereof.

Referring now to Figures 16 to 20 inclusive, I provide a cover 80 made of good insulating and preferably mouldable material such as resilient rubber. The cover 80 has a pair of orifices 81, 81 on the front thereof and after the contact block 72 has been secured in place and electrically connected as described, wires 44, 44 from a hanging conductor 45 that is to be connected to the conduit 40 are passed through the holes 81. The ends of the wires 82, 82 (see Figure 12) are then secured to the screw binding posts 75, whereupon the cover 80 is secured in place on the extension feeder 40 covering the contact block 72. Still referring to Figures 16 to 20 inclusive, the cover 80 has narrow rectangular openings 84 at either end thereof and a somewhat bulging central portion 85 having bottom flanges 86, 86. In securing the cover 80 in place the flanges 86 are spread apart to allow them to pass over flaps 34 and screws 74 and 75; and the flanges 86, as well as the sides of the openings 84, are so spaced that they resiliently grip the sides of the conduit 40, as shown in Figure 12.

Referring now to Figure 1, hanging conductors 45 may be located at any desired point in a room serviced with an extension feeder 40 by connection thereto as described. The facing material 42 may be made to blend with the color of the wall or may have an artistic design in order to be decorative. Figure 1 suggests one arrangement of hanging conductors which is symmetric and illustrates how the wiring of a room may be carried out to provide the desired outlets and supply current to desired fixtures with a decorative arrangement. By reason of the ease with which a hanging conductor 45 may be connected at any desired point to an extension feeder 40, and by reason of the ease with which an opening in an extension feeder 40 may be recovered, the wiring for a room may be changed with a minimum amount of expense and without providing new wiring material.

Figures 6, 7, 8, 9, 10:
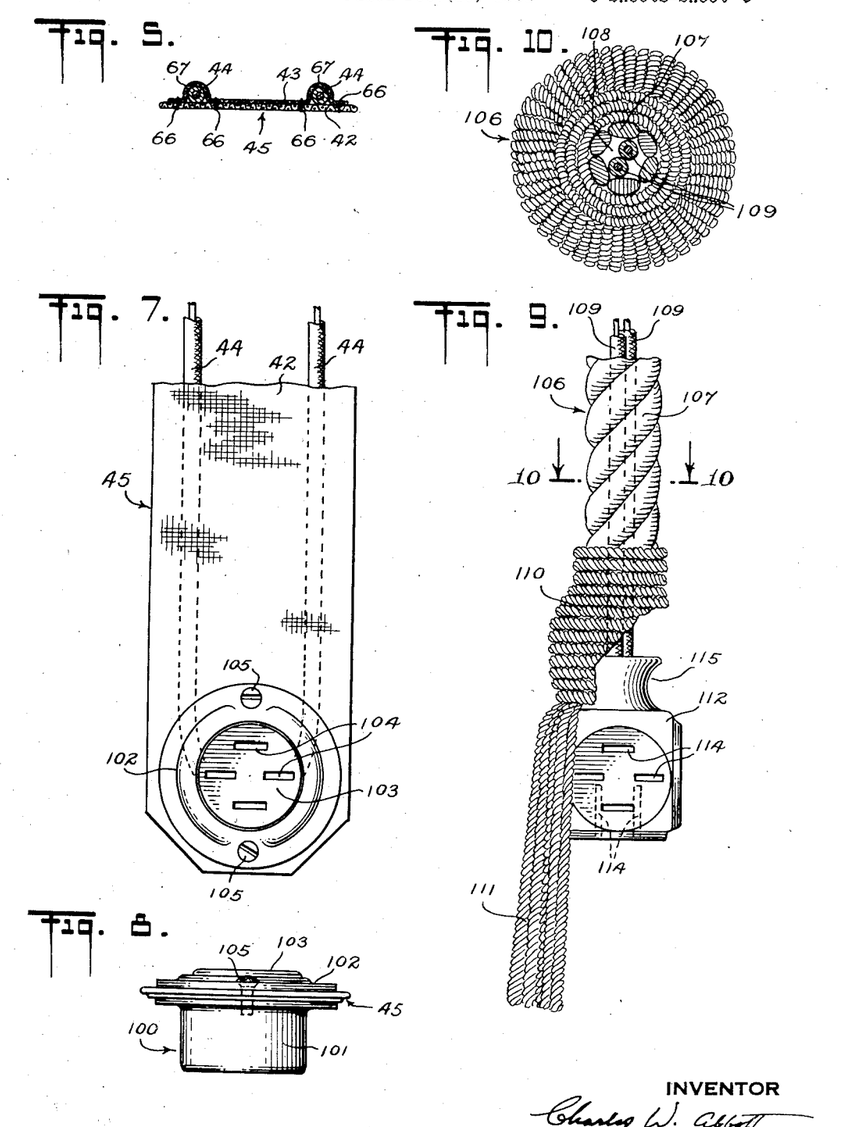
Figure 6 is a perspective view of a fixture attached to a hanging conductor.
Figure 7 is a front elevation of a hanging conductor and outlet receptacle.
Figure 8 is a bottom view of the hanging conductor and outlet receptacle of Figure 7.
Figure 9 is a front elevation of a modified form of hanging conductor and outlet receptacle, a certain portion of the decoration of the hanging conductor being broken away to show the receptacle.
Figure 10 is a cross sectional view of the hanging conductor of Figure 9 taken on the line 10—10 of Figure 9 looking in the direction of the arrows.
Figure 6:
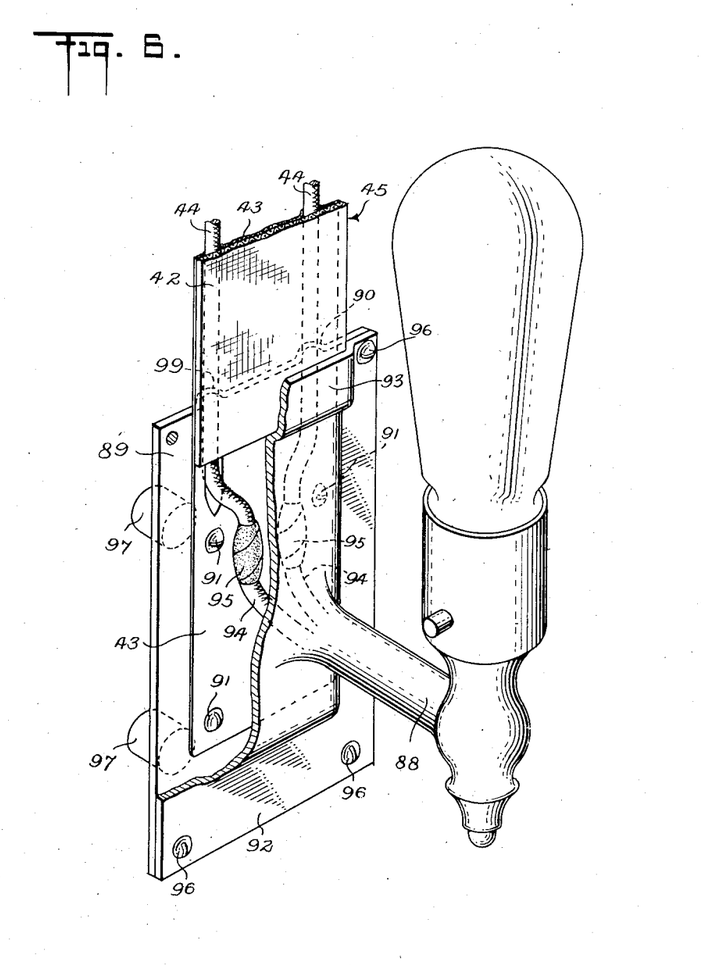

Figure 1 illustrates a pair of fixtures 88 supported by and electrically energized by hanging conductors 45. Obviously the fixtures 88 may be of any desired type, and referring now to Figure 7, a method of attachment of a fixture 88 to a hanging conductor 45 and means for so attaching it are illustrated. As shown in Figure 6, a metal base plate 89 has depressions 90, 90 formed therein to accommodate the conductors 44, 44 of a hanging conductor 45. Prior to making the connection the facing 42 of the hanging conductor is cut off considerably above the lower end of the lining or backing 43, leaving the wires 44, 44 exposed at the front of the hanging conductor 45. The lining 43 is then firmly secured to the base plate 89 in any suitable manner, as by means of four screws 91.

There may be integrally formed with the bracket 88 a canopy 92 having the same area as the base plate 89 and having a raised portion 93 to provide clearance for the hanging conductor 45 and the wires 44. The wires 44, 44 are attached to wires 94, 94 of the fixture 88 and the junctions taped over, as indicated at 95, 95, whereupon the front plate 92 is attached to the base plate 89, as by means of four screws 96. The base plate 89 may have clearance lugs 97 to space it from the wall of the room in order that the surface of the wall shall not be defaced by screw ends protruding through the base plate 89, or by the edges or corners of the base plate, and in order to reduce swinging of the hanging conductor with drafts or otherwise, and the lugs 97 may be made of cellulose or other suitable material in order that they shall not mark wallpapers. It should be understood that the form and arrangement of a hanging conductor 45 to a fixture 88 may be varied.

Referring to the right-hand side of Figure 1, one of the hanging conductors 45 connects in circuit an outlet receptacle 100. Referring now to Figures 7 and 8, the outlet receptacle 100 comprises a box portion 101 and a front portion 102 between which is secured the hanging conductor 45. In order to secure the outlet 100 in place on the hanging conductor, the latter has first made in it a hole having a diameter large enough to receive the body portion 103 of the outlet 100, this body portion 103 having the usual slots 104 for the reception of the prongs of a plug. The front plate 102 is then secured to the box 101, as by means of screws 105 securely clamping the hanging conductor 45 in position. The hanging conductor 45 may be trimmed off, as shown in Figure 7, or in any other desired manner. The outlet 100 spaces the hanging conductor 45 from the wall of a room by about the same distance that the moulding 39 spaces it, and thus the hanging conductor 45 lies substantially in a vertical plane. It should be understood that the outlet 100 may be rigidly secured in place by any suitable means if desired, although in the interests of flexibility of the system, it is preferred to have it free.

Referring now to Figures 9 and 10, there is shown a modified form of hanging conductor generally designated by the numeral 106. A twisted or braided rope 107, which may be of silk cord, or otherwise decorative, has a hollow interior 108 receiving a pair of insulated wires 109, 109. The bottom of the rope 107 is bound with circumferentially extending cord 110 below which extends a tassel 111. The wires 109, 109 are attached to the binding posts of an electrical device such as a lamp socket or the like, herein exemplified by an outlet receptacle 112 having the usual slots 114 for the reception of the prongs of a plug. The socket 112 is supported partly by the wires 109, 109 and partly by the circumferentially extending cord 110 which fits in a groove 115 in the socket 112.

Figure 13:
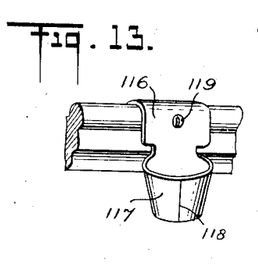
Figure 13 is a perspective view of a support for the hanging conductor of Figures 9 and 10.
Figures 14, 15:
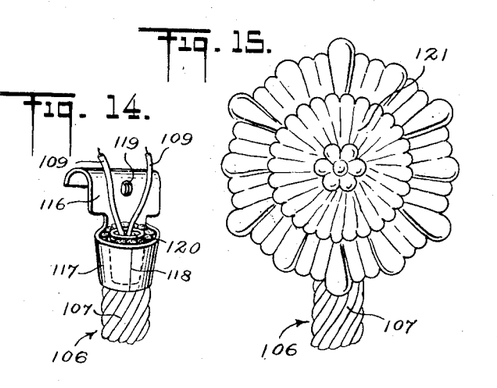
Figure 14 is a view similar to Figure 13 showing the hanging conductor secured in position.
Figure 15 is a perspective view of a hanging conductor of the form shown in Figures 9 and 10 showing the connection to an extension feeder and the support for the hanging conductor concealed by a rosette.

Referring now to Figures 13 and 14, the rope-like hanging conductor 106 may be supported from a picture moulding or the like by means of a hook 116 having integrally formed therewith or connected thereto a hollow cone 117. The hook 116 and the cone 117 may be made by a pressing or stamping operation, either as one piece, in which case the two sides of the cone 117 may be welded together as indicated at 118, or the cone 117 may be seamless and welded to or soldered to the hook 116, or any other suitable method of manufacture of this part may be adopted. Preferably the hook 116 is rigidly secured in a desired position by means of a screw 119 which, however, will leave only a very small hole in case of re-location of the hook which may be readily plugged with putty or the like.

The rope-like material 107 is passed through the cone 117, whereupon an inner and smaller cone 120 is inserted inside of the material 107 and forced downwardly to compress the strands of the rope-like material, thus to hold the hanging conductor 106. Preferably the inner surface of the cone 117 and outer surface of the cone 120 are roughened so that these parts may firmly grip the strand-like material interposed between them. The wires 109, 109 pass through the inner cone 120 and may be secured to an extension feeder 40 in the manner already described. Referring now to Figure 15, preferably a rosette 121 or other concealing device is used to cover the hook 116 and the cone 117 including the projecting wires 109 and also the cover 80. The rosette may be secured in place by means of a hook, not shown, or in any other suitable manner. The hanging conductor 106 may, of course, be used with a hanging conductor 45 or separately.

Although the hanging conductors 45 and 106 preferably are freely suspended upon the walls of a room wired in accordance with the invention, it is noted that the form thereof permits their rigid attachment to walls, or the like, if desired. The central portion of the hanging conductor 45 may have screws or other fastening means passing through it without in any way interfering with insulation of the wires 44, 44, and a hanging conductor of the type illustrated by the embodiment designated by the numeral 106 may be secured in place by brackets.

Referring now to Figure 21, a hanging conductor 45 is shown which may be of the same construction as that already described and illustrated in Figure 3 for example. In some cases it may be desirable to make the facing 42 of a hanging conductor 45 of tough material. Such a hanging conductor, its facing and backing both being made of tough material, has great strength. For the purpose of giving such a hanging conductor an attractive appearance, I may provide a covering for it such as is illustrated in Figures 21 and 22, or such as is illustrated in Figure 23.

Referring now to Figures 21 and 22, the covering 125 therein illustrated is a tubular woven tape or ribbon which may be ornamented as desired. It may, for example, be a satin ribbon, and preferably has a pair of selvages 126, 126 to hold it in shape and maintain the flat appearance thereof. Such a covering 125 may be made seamless upon a tape or ribbon loom in a continuous process.

Figure 23:
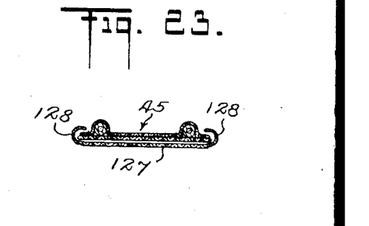
Figure 23 is a transverse sectional view illustrating a modified form of covering for a hanging conductor.

Figure 23 illustrates in transverse sectional view a hanging conductor 45 having a covering 127 of slightly different form from the covering 125. The covering 127 comprises a body of ribbon or tape having fastened to the edges or selvages thereof thin bendable pieces of metal 128, 128. Such metal may be of thin brass, and may be attached with a sewing machine or in any other suitable manner. When originally attached the metal pieces 128 are flat, but they may be crimped over, as shown in Figure 23, for the purpose of holding the covering 127 in place.

Thus the wiring system of the invention is adapted to many different manners of use and it will be seen that there has been provided by this invention an apparatus in which the various objects hereinabove set forth, together with many thoroughly practical advantages, are successfully achieved.

As many possible embodiments may be made in the above invention and as many changes might be made in the embodiment above set forth, it is to be understood that all matter hereinbefore set forth or shown in the accompanying drawings is to be interpreted as illustrative and not in a limiting sense.

I claim:

1. In apparatus of the class described, a rope-like hanging conductor, hook means for attaching it to a moulding, said hook means including a conical member for receiving the hanging conductor, and means for securing said hanging conductor to said hook means, said securing means including means for spreading said rope-like hanging conductor against the inside wall of said conical member.

2. In apparatus of the class described, a hook, a conical socket forming part of said hook, a hollow rope passing through said socket, a smaller cone affixing said rope to said socket located on the inside of said rope, and conductors in said rope extending through said cones.

3. In apparatus of the class described, in combination, a flexible conductor-receiving conduit made up of a backing of fabric having good tensile strength and a facing, said conduit being band-like in form, a plurality of channels extending lengthwise of and spaced in a direction crosswise of said conduit and between the backing and facing thereof, and conductors in said channels, said conductors being received within their respective channels with sufficient looseness so that any tension to which the structure is subjected is taken up by the said backing and not by said conductors, and said backing being adapted to assume any tension to which the conduit may be subjected and to relieve also said facing thereof.

4. In apparatus of the class described, in combination, a flexible conductor-receiving conduit made up of a backing of fabric having good tensile strength and a facing, whereby said backing assumes tensile strains to which said conduit is subjected and relieves said facing therefrom said conduit being band-like in form, a plurality of channels extending lengthwise of and spaced in a direction crosswise of said conduit, each channel being formed by a pleat in one of the members of said conduit, and conductors in said channels.

5. In apparatus of the class described, in combination, a flexible conductor-receiving conduit made up of a backing of fabric having good tensile strength and a facing, whereby said backing assumes tensile strains to which said conduit is subjected and relieves said facing therefrom said conduit being band-like in form, said facing and backing being stitched together by a plurality of spaced lines of stitching extending lengthwise of said conduit, thereby forming channels between adjacent rows of stitching, for the reception of conductors therein.

6. In apparatus of the class described, in combination, a conductor-receiving conduit of non-metallic flexible material having good tensile strength and having a conductor-receiving channel extending lengthwise thereof, means for anchoring an upper end of said conduit to a support or the like, an electrical device, means for securing said electrical device to the lower end of said conduit, a conductor in said channel leading to and connected to said electrical device and received therein sufficiently loosely so that any tension to which the structure is subjected is taken up by the conduit and not by the conductor.

7. In apparatus of the class described, in combination, a conductor-receiving conduit of non-metallic flexible material having good tensile strength and having a conductor-receiving channel extending lengthwise thereof, a conductor in said channel and received therein sufficiently loosely so that any tension to which the structure is subjected is taken up by the conduit and not by the conductor, means for anchoring an upper end of said conduit to a wall whereby said conduit hangs lengthwise and along the surface of the wall, an electrical fixture having a base portion secured to the lower end of said conduit and having a part projecting away from the plane of said conduit, said fixture being in electrical connection with said conductor, said base portion having means for engaging the surface of the wall to prevent said projecting part from tilting said fixture.

8. In apparatus of the class described, in combination, means for bringing the conductors of a wall conduit into electrical connection with the connecting terminals of a flush wall receptacle contained in an outlet box, comprising a mat made of a semi-rigid material like rubber of substantially the same dimensions as the cover plate of the outlet box, the mat being interposed between the box or wall and the cover plate and the mat being cut-away or cut out to receive therethrough the outlet receptacle and the lugs of the outlet receptacle resting against the outer face of the mat, securing screws passing through the lugs and through the mat and into the threaded lugs of the box, and a cover plate secured to the outlet receptacle construction, the mat being of a sufficient thickness to allow the wall conduit to enter into the space between the wall and the cover plate.

9. An apparatus like that claimed in claim 8 in which the mat is made of at least two thicknesses or layers, two adjacent layers being shaped so that one has a concave channel extending from an edge thereof to the cut-away part of the mat and the other has a convex ridge-like projection fitting into the concave channel, whereby upon cutting away the second-mentioned layer with its convex portion, the concave channel is available for the reception of a conductor leading from the wall conduit to the connecting terminal of the receptacle.

10. In apparatus of the class described, in combination, means for bringing the conductors of a wall conduit into electrical connection with the connecting terminals of a flush wall receptacle contained in an outlet box, comprising a mat of substantially the same dimensions as the cover plate of the outlet box, the mat being interposed between the box or wall and the cover plate and the mat being cut-away or cut out to receive therethrough the outlet receptacle and the lugs of the outlet receptacle resting against the outer face of the mat, securing screws passing through the lugs and through the mat and into the threaded lugs of the box, and a cover plate secured to the outlet receptacle construction, the mat being of a sufficient thickness to allow the wall conduit to enter into the space between the wall and the cover plate, said mat being made of at least two thicknesses or layers, two adjacent layers being shaped so that one of said layers has a plurality of concave channels extending from more than one side edge of the mat to the cut-away part of the mat and the other has a corresponding plurality of convex ridge-like projections respectively fitting into said concave channels, whereby conductor-receiving channels may be provided from more than one side edge of the mat or from any of said side edges of the mat, upon cutting away the second-mentioned layer with its convex portion, in accordance with the direction from which the wall conduit extends.

11. In apparatus of the class described, in combination, means for bringing the conductors of a wall conduit into electrical connection with the connecting terminals of a flush wall receptacle contained in an outlet box, comprising a mat of substantially the same dimensions as the cover plate of the outlet box, the mat being interposed between the box or wall and the cover plate and the mat being cut-away or cut out to receive therethrough the outlet receptacle and the lugs of the outlet receptacle resting against the outer face of the mat, securing screws passing through the lugs and through the mat and into the threaded lugs of the box, and a cover plate secured to the outlet receptacle construction, the mat being of a sufficient thickness to allow the wall conduit to enter into the space between the wall and the cover plate, and means for clamping the wall conduit in said space between the wall and the cover plate.

12. In apparatus of the class described, in combination, means for bringing the conductors of a wall conduit into electrical connection with the connecting terminals of a flush wall receptacle contained in an outlet box, comprising a mat of substantially the same dimensions as the cover plate of the outlet box, the mat being interposed between the box or wall and the cover plate and the mat being cut-away or cut out to receive therethrough the outlet receptacle and the lugs of the outlet receptacle resting against the outer face of the mat, securing screws passing through the lugs and through the mat and into the threaded lugs of the box, a cover plate secured to the outlet receptacle construction, the mat being of a sufficient thickness to allow the wall conduit to enter into the space between the wall and the cover plate, two adjacent layers being shaped so that one has a concave channel extending from an edge thereof to the cut-away part of the mat and the other has a convex ridge-like projection fitting into the concave channel, whereby upon cutting away the second-mentioned layer with its convex portion, the concave channel is available for the reception of a conductor leading from the wall conduit to the connecting terminal of the receptacle, and means for clamping the wall conduit in the space where the mat has been cut away to provide a conductor-receiving channel, the clamping means acting to clamp the wall conduit against the uncut mat layer.

13. In apparatus of the class described, in combination, means for bringing the conductors of a wall conduit into electrical connection with the connecting terminals of a flush wall receptacle device or the like contained in an outlet box, comprising cover means for said outlet box, said cover means having a plate-like portion adapted, when said cover means is secured in place, to extend substantially parallel to the face of said wall, and having peripherally extending means extending thereabout and between said wall and said plate-like portion for spacing said plate-like portion away from the plane of said wall, said peripheral means having a portion thereof cutaway or cut out to receive therethrough said wall conduit, the latter extending between said wall and said plate-like portion, whereby the conductors in said wall conduit are brought into said outlet box for connection with the said connecting terminals of the device therein, and means for securing said cover means in box-covering position.

14. In apparatus of the character described, in combination, a non-metallic conduit made of a material having good tensile strength and having a channel extending therealong, a conductor extending through said channel, and means for suspending said conduit and conductor without subjecting the latter to tension, said means comprising a two-part member between which said conduit is engaged and secured at least one of said parts being fluted in the direction of the length of said conduit and in line with the channel in the latter, thereby to freely accommodate said channel-enclosed conductor between said two parts.

15. In apparatus of the character described, in combination, a non-metallic conduit made of a material having good tensile strength and having a channel extending therealong, a conductor extending through said channel, and means for suspending said conduit with said conductor without subjecting the latter to tension, said means comprising a two-part support between which said conduit with the conductor in the channel thereof extends, and securing means passing through both of said parts and said conduit.

16. In apparatus of the character described, in combination, a non-metallic conduit made of a material having good tensile strength and having a channel extending therealong, a conductor extending through said channel, an electrical device, and means for securing said device to said conduit without subjecting said conductor in the channel thereof to tension, said means comprising a two-part member between which said conduit extends and to which said conduit is secured, at least one of said parts having a flute therein to accommodate said channel-encased conductor.

17. In apparatus of the character described, in combination, a non-metallic conduit made of a material having good tensile strength and having a channel extending therealong, a conductor extending through said channel, an electrical device, and means for securing said device to said conduit without subjecting said conductor in the channel thereof to tension, said means comprising a two-part device between which said conduit is received and means for clamping said conduit therebetween excepting at that portion of the latter along which said conductor-containing channel extends.

18. In apparatus of the character described, in combination, a band-like conduit having a plurality of laterally spaced longitudinally extending channels therein and conductors in said channels, means for suspending said conduit, said means comprising a two-part device and means for drawing said two parts together, thereby to clamp said conduit, said parts being shaped to provide a greater space therebetween along the lines of said conductor-containing channels, thereby to accommodate the latter.

19. In apparatus of the character described, in combination, a band-like conduit having a plurality of laterally spaced longitudinally extending channels therein and conductors in said channels, an electrical device, and means for securing said device to an end of said conduit, said means comprising a two-part device and means for securing said conduit therebetween, said parts of said device being shaped to provide larger spaces along the lines of said conductor-containing channels, thereby to accommodate the latter, whereby said conductors are brought through said two-part device and into said electrical device.

20. In apparatus of the character described, in combination, a conduit made up of two band-like members of fabric material, one of which is of greater width than the other and having their longitudinal edge portions substantially back to back and stitched together, whereby the member of greater width is caused to form a U-shaped raceway closed along its length by the member of lesser width, thereby to form a closed channel extending lengthwise of said joined members, and a conductor extending along said channel; supporting means to which said conduit is to be attached, said supporting means comprising two coacting members movable toward or away from each other and receiving said conduit therebetween, and means for drawing and holding said two members in a position to clamp said conduit therebetween, one of said members being recessed in line with said closed channel of said conduit thereby to accommodate the latter and the said conductor therein.

21. In construction of the character described, in combination, a conduit comprising a band-like material having a plurality of transversely spaced longitudinally extending channels therein and conductors in said channels, said channels having a greater dimension than the thickness of said conduit and thereby protruding beyond the plane of a face of said band-like material, and a device to which said conduit is attached, said device having opposed portions between which said band-like material with its transversely spaced and protruding channels extends and is received, said portions having dimensions in a direction transversely of said conduit substantially equal to the transverse dimension of said conduit, and means for holding said conduit against withdrawal from in-between said portions, said portions being shaped to provide a space therebetween along the lines of said conductor-containing channels commensurate in dimensions to the dimensions of the protrusions of said channels for accommodating the latter and to hold said conduit spread out transversely of itself.

22. In construction of the character described, in combination, a conduit comprising a band-like material having a plurality of transversely spaced longitudinally extending channels therein and conductors in said channels, said channels having a greater dimension than the thickness of said conduit and thereby protruding beyond the plane of a face of said band-like material, and a device to which said conduit is attached, said device having opposed portions between which said band-like material with its transversely spaced and protruding channels extends and is received, said portions having dimensions in a direction transversely of said conduit substantially equal to the transverse dimension of said conduit, and means effective intermediate of said conductor-containing channels for holding said two portions together and for anchoring said conduit against withdrawal from in-between said portions, said portions being shaped to provide a space therebetween along the lines of said conductor-containing channels commensurate in dimensions to the dimensions of the protrusions of said channels for accommodating the latter and to hold said conduit spread out transversely of itself.

23. A system for suspending an electrical fixture from a fixed part such as a wall or the like and for supplying the fixture with electrical energy, comprising, in combination, a non-metallic conduit made of material having good tensile strength and having a channel extending therealong, a conductor extending through said channel, a device adapted to be secured to a fixed part, such as a wall or the like, said device having means for anchoring thereto the upper end of said conduit, said last-mentioned means being free from substantial anchoring effect upon the conductor in said channel, an electrical fixture at the lower end of said conduit and in electrical connection with the conductor emerging from the channel in the latter, said fixture having means for securing thereto the lower end of said conduit and said securing means being free from substantial securing effect upon the conductor in said channel, whereby the weight of said fixture is sustained by the material of said conduit and said conductor is freed from any substantial tensile strains.

24. A system for suspending an electrical fixture from a fixed part such as a wall or the like and for supplying the fixture with electrical energy, comprising, in combination, a hollow rope conduit having a channel extending substantially centrally therethrough and a conductor extending through said channel, a device adapted to be secured to a fixed part such as a wall or the like, said device having means for securing the peripheral portions of said rope conduit at the upper end of the latter, said conductor in said conduit passing freely through said securing means, an electrical fixture at the lower end of said rope conduit and in electrical connection with the conductor emerging from the channel in the latter, said fixture having means for anchoring the peripheral portions of the lower end of said rope conduit, said emerging conductor freely bypassing said anchoring means, whereby said conductor is relieved of the tension to which said conduit may be subjected.

25. In construction of the character described, the combination with a wall or the like having secured thereto the upper end of a downwardly extending and hanging conductor means, of a lamp bracket secured to the lower end of said conductor means, said bracket having a plate-like member on that side thereof toward the wall, and spacer means on said plate member to space the latter and said lamp bracket from the wall.

26. In construction of the character described, in combination, a flexible band-like conductor means comprising a length of band-like fabric having two laterally spaced longitudinally extending channels therein and conductors in said channels, said channels being of greater dimension than the thickness of the fabric, and two spaced devices between which said conductor means extends, said devices having means for securing said band-like fabric thereto and for holding said channels spaced apart, thereby to resist any tendency of intermediate portions of said band-like fabric to wrinkle or curl transversely of itself.

CHARLES W. ABBOTT.